May 26, 1925.  
W. A. RIDDELL  
1,539,410  
PHOTOGRAPHIC SHUTTER  
Filed Oct. 1, 1921  
2 Sheets-Sheet 1
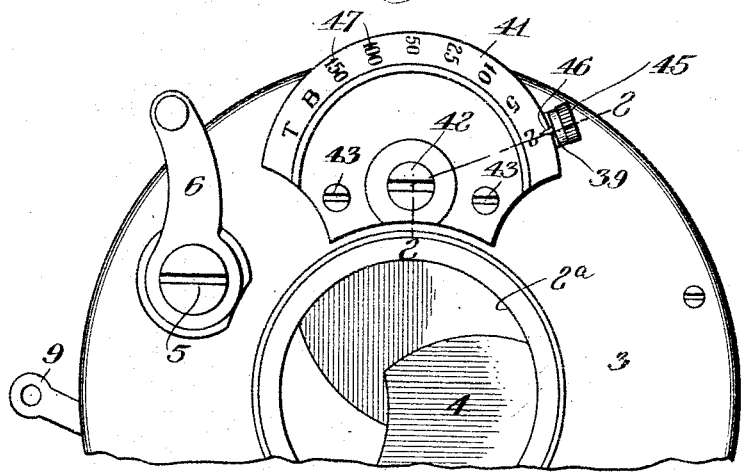
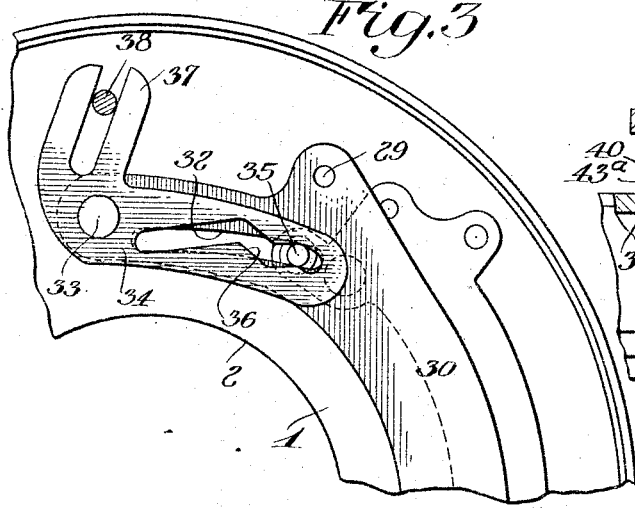
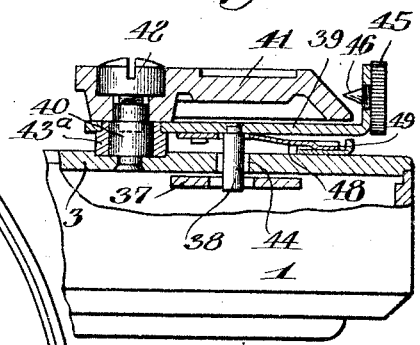
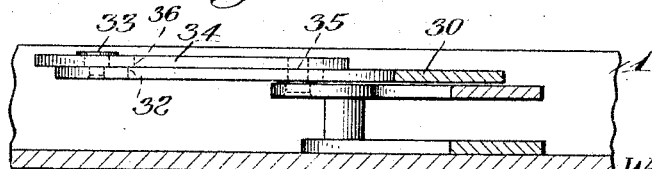
INVENTOR.
William A. Riddell
BY
Frederick G. Church
his ATTORNEY May 26, 1925.　　　　W. A. RIDDELL　　　　1,539,410
PHOTOGRAPHIC SHUTTER
Filed Oct. 1, 1921　　　2 Sheets-Sheet 2

INVENTOR.
William A. Riddell
BY
his ATTORNEY

Patented May 26, 1925.

1,539,410

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER.

Application filed October 1, 1921. Serial No. 504,717.

*To all whom it may concern:*

Be it known that I, WILLIAM A. RIDDELL, a citizen of the United States, of Rochester, in the county of Monroe and State of New York, have invented certain new and useful Improvements in Photographic Shutters; and I do hereby declare the following to be a full, clear, and exact description of the same, reference being had to the accompanying drawings, forming a part of this specification, and to the reference numerals marked thereon.

My present invention relates to photography and, more particularly, to photographic shutters of the type embodying a blade mechanism, an actuating mechanism therefor and a retarding mechanism also driven by the actuating mechanism to control the length of the exposure affected by the blades. The invention has for its object to improve certain features of the retarding mechanism whereby a more sensitive, accurate and durable shutter is produced. The improvements are further directed toward features whereby the assembling and regulating of the shutter are made more convenient. To these and other ends the invention consists in certain improvements and combinations of parts, all as will be hereinafter more fully described, the novel features being pointed out in the claims at the end of the specification.

In the drawings:

Figure 1 is a front fragmentary view of a shutter constructed in accordance with and illustrating one embodiment of my invention;

Figure 2 is an enlarged fragmentary section on the line 2—2 of Figure 1;

Figure 3 is an enlarged fragmentary view of several of the adjusting elements of the retarding mechanism;

Figure 4 is a side view partly in section of the parts shown in Figure 3;

Similar reference numerals throughout the several views indicate the same parts.

Figure 5:
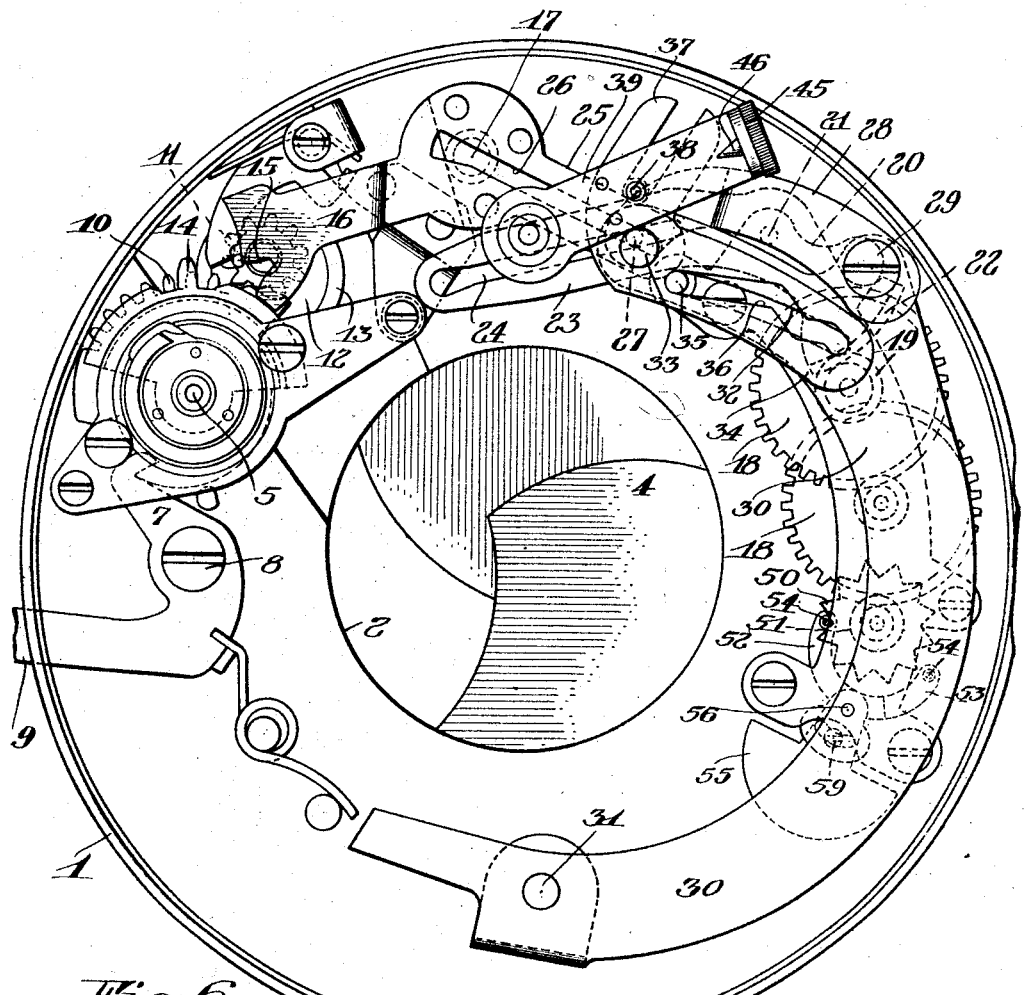
Figure 5 is a front view of the interior mechanism with the cover removed but with the index arm carried thereby shown in position.

My improvements are particularly adapted, and I have shown them applied to the modern type of pivoted blade, symmetrical opening shutter with a gear train retarding device. Such a shutter is shown and explained in detail in the patent to F. A. G. Pirwitz, No. 1,307,751, June 24, 1919, and such shutter, regarded as a type, comprises in general a blade mechanism and a spring driven motor or master member which when set and released opens and closes the blade, during which movement its power is resisted to a greater or less extent as desired by a gear train that it also drives at the same time. The motor power is transmitted from the master member to the gear train through a swinging segment, the fulcrum pin of which may be adjusted to different positions by a manually operated device on the exterior of the shutter casing, whereby the throw of the segment is increased or diminished and the dragging effect of the gear train correspondingly adjusted. Aside from the inertia and frictional resistance of the wheels of the gear train themselves, the retarding effect is augmented by the provision of an escapement at the end of the train. The present invention has reference to improvements in this escapement; to improvements in the shifting fulcrum of the segment and to improvements in the manually operable indicator arm whereby the fulcrum is controlled, and the construction and operation of the shutter, aside from sub-mechanisms directly affecting these parts, will be only very briefly referred to herein, the reader being referred to the above mentioned Pirwitz patent for general construction the same as that shown in the present drawings, or equally well adapted for use in connection with the present invention.

Referring more particularly to the drawings, 1 indicates the usual annular shutter casing with a central lens opening 2 and 3 a cover plate therefor having a similar central opening 2ª. The shutter blades 4, shown closed in the figures, open and close symmetrically under the influence of a rotary master member that is spring driven and turns on a center indicated at 5 in Figure 5. The master member is wound by a setting lever 6 shown in Figure 1, and withheld by a detent 7 pivoted at 8 and terminating in an exteriorly arranged release lever 9 also shown in Figure 1, the present shutter being of the "set" as distinguished from the "automatic" type.

The master member is shown set in Figure 5 and comprises a gear segment 10 which, when released, drives the pinion 11. Fixed to this pinion is an eccentric 12 and an eccentric strap 13 that is suitably connected to the blade actuating mechanism to open and then close the blades with one movement of the master member in the one direction. The master member is also provided with a larger gear tooth 14 that is adapted, while the blades are being operated to engage in a tooth shaped opening 15 in a lever 16 turning on a center indicated at 17. This is an intermediate lever for transmitting motion from the master member to the retarding mechanism so that the influence of the latter will be exerted upon the master member while the blades are open.

The retarding mechanism embodies a train of gears 18 and meshing with the pinion 19 on the first gear is a gear segment 20 pivoted at 21 and the tooth portion of which is indicated, also in dotted lines, at 22. The opposite arm 23 of the segment is provided with a slot 24 as is an arm 25 of the transmitting lever 16, the slot in the latter being indicated at 26. A shiftable fulcrum pin 27 occupies both slots which is permitted by the fact that one lever arm 23 overlies the other lever arm 25, and by moving this fulcrum pin toward the pivot of one lever and away from the pivot of the other the leverage between the transmitting lever and the segment is increased or diminished at will, and the swing of the segment is thereby made greater or less with a consequent increase or decrease in its drive to the gear train and a resulting greater or less retarding action.

The fulcrum pin 27 is carried at the free end of a curved link 28 pivoted at 29 to a large semi-annular regulating lever 30 pivoted at 31 to the shutter casing, it being obvious that the vibrations of this lever will, through the link 28, shift the fulcrum pin 27. The upper or free end of the regulating lever, as shown in Figure 3, is provided with a segmental slot 32 and has pivoted to it at 33 adjacent to this slot a connecting element 34 (see Figure 3) in the present form of a bell crank lever which is an intermediate device through which an operating or adjusting means on the exterior of the shutter controls the position of the regulating element 30. The purpose of this connecting lever is to afford a means whereby equal movements of the said operating member through an arc will produce equal movements of the regulating element 30 and hence equal movements of the shiftable fulcrum pin 27. Such results are accomplished in this way:

The slot 32 in the regulator 30 is concentric with the pivot 31 of the latter and rides upon a pin 35 fixed to the shutter casing. One arm of the bell crank 34 is provided with an irregular or cam shaped slot 36 by means of which it also rides upon the fixed pin 35. The other arm of the bell crank is bifurcated at 37 to receive a pin 38 that has an arcuate movement. This pin 38 (Figure 2) has an arcuate movement being fixed to a swinging hand operated lever 39 pivoted to turn freely on a stud 40 riveted to the cover plate 3 as shown in said figure. The lever is held on its pivot by a fixed overlying segmental index dial 41 that is secured on the stud 40 by screw 42 and is also fastened to the casing by screws 43, as shown in Figure 1. This index dial is spaced from the cover plate 3 by the hub 43$^a$ of the operating arm 39 permitting the arm to move beneath it, and the pin 38 projects into the interior of the shutter casing to engage the bifurcation of the bell crank 37 through a segmental slot 44 in the cover plate 3. A thumb piece 45 on the operating arm 39 has an extension 46 constituting an indicator cooperating with the dial 41, and the latter is divided into a number of equally spaced graduations 47 formed by characters representative of the different speeds for which the shutter is to be adjusted.

Inasmuch as the operating lever 39 turns on a different center from both the regulator 30 and the connecting lever 34, it is evident that equal arcuate movements thereof and of the pin 38 would not ordinarily result in transmitting impulses of equal amplitude to the regulator 30. The cam slot 36 however in conjunction with the fixed pin 35 provides a lost motion connection between the operating lever and the regulator 30 inasmuch as, in certain relative positions of the pin and cam, the connecting lever or bell crank 34 will move relatively to the regulator 30 by which it is carried when actuated by the pin 38. At other times the slots 32 and 36 will be in substantially coincident relationship to the pin 35 and all of the movement imparted to the connecting lever 34 will be transmitted to the regulator 30. This differential movement or lost motion connection therefor makes uniform in its results the throw of the operating lever 39 at different points in its arc and allows the graduations or characters 47 to be equally spaced which is of convenience in the layout and use of the dial, no very fine movements of the arm 39 being required.

Another advantage of the structure described is that all of the operating mechanism of the regulator is carried by and is a complete assembly on the cover plate 3 and need not be disturbed when the cover plate is removed. The pin 38, further, automatically takes its engagement with the interior shutter mechanism when the cover plate is replaced.

I have shown in Figure 2 a spring finger 48 secured to the under side of the operating arm 39 that has a frictional and semi-locking engagement with a ribbed segmental plate 49 on the cover plate 3 to yieldably retain the arm 39 in its various positions of adjustment and to center it there.

Figure 6:
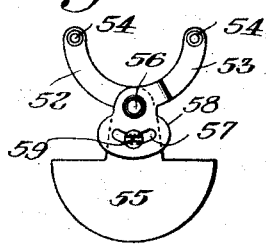
Figure 6 is a plan view of the escapement pallet or anchor removed.
Figure 7:
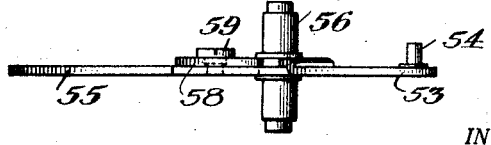
Figure 7 is a side view of said pallet enlarged.

The retarding mechanism of the gear train in addition to the gearing 18 embodies an escapement device at the end of the train, the inertia of which adds to the retarding action. This consists in the present instance of a star or scape wheel 50 having fixed thereto a pinion 51 driven by the last gear of the train. Cooperating with this star wheel is a pallet or anchor having arms 52 and 53 provided with pins 54 engaging the wheel in the usual way. One of the arms 52 as shown in Figures 6 and 7, is extended to provide a weight 55, and the other arm 53 is pivoted to it at 56. A segmental slot 57 in an enlarged portion 58 of this other arm 53 receives a set screw 59 on the arm 52 whereby the two arms may be rotatably adjusted upon each other and secured in position to give a desired degree of separation to the pins 54. In this way the pallet may be conveniently and very carefully and sensitively adjusted to the star wheel to give perfect escaping movement and provide the desired behavior on the part of the retarding mechanism as a whole. This permits the star wheel to be stamped out and the pins 54 to be mounted without the care and fine workmanship that would otherwise be required for the same result, and the feature is an important one in the matter of commercial production.

I claim as my invention:

1. In a photographic shutter, the combination with blade mechanism, actuating mechanism therefor and a retarding device also driven by the actuating mechanism, of a pivoted element for regulating the influence of the retarding device and a pivoted element, turning on a different center, for operating the regulating element and having a lost motion connection therewith for the purposes set forth.

2. In a photographic shutter, the combination with blade mechanism, actuating mechanism therefor and a retarding device also driven by the actuating mechanism, of a regulating element for varying the influence of the retarding device, and a pivoted operating member therefor having a lost motion connection therewith for the purposes set forth.

3. In a photographic shutter, the combination with blade mechanism, actuating mechanism therefor and a retarding device also driven by the actuating mechanism, of a scale having equally spaced graduations thereon, a regulating element for varying the influence of the retarding device, and a pivoted operating member therefor having a lost motion connection therewith for the purposes set forth and provided with an indicator cooperating with the scale.

4. In a photographic shutter, the combination with blade mechanism, actuating mechanism therefor and a retarding device also driven by the actuating mechanism, of a regulating element for varying the influence of the retarding device, a pivoted operating member therefor and a pivoted connecting element between the operating and regulating elements having a lost motion engagement with one of them for the purposes set forth.

5. In a photographic shutter, the combination with blade mechanism, actuating mechanism therefor and a retarding device also driven by the actuating mechanism, of a regulating element for varying the influence of the retarding device, a pivoted operating member therefor and a connecting element pivoted to one of said parts and guided upon a fixed part of the structure to move the regulating element subject to a predetermined and progressive movement of its own relative to the element upon which it is pivoted.

6. In a photographic shutter, the combination with blade mechanism, actuating mechanism therefor and a retarding device also driven by the actuating mechanism, of a regulating element for varying the influence of the retarding device, a pivoted operating member therefor, a relatively fixed guide and a lever pivoted to the regulating element and having a cam track cooperating with the guide, said lever being adapted to engage and transmit motion from the operating member to the regulating element subject to the independent movement of said lever as controlled by the cam and guide.

7. In a photographic shutter, the combination with blade mechanism, actuating mechanism therefor and a retarding device also driven by the actuating mechanism, of a regulating element for varying the influence of the retarding device, a pivoted operating member therefor, a relatively fixed guide pin, and a lever pivoted to the regulating element and having a forked arm at one end engaging the operating member and a cam slot at its other end slidable on the guide pin, said lever being adapted to transmit motion from the operating member to the regulating element subject to the independent movement of said lever as controlled by the cam slot and guide pin.

8. In a photographic shutter, the combination with blade mechanism and actuating mechanism therefor, of a retarding device also driven by the actuating mechanism and embodying a star wheel and pallet, the arms of the latter being relatively movable to regulate the degree of separation of its contact points, and means for securing the arms in relatively fixed positions.

9. In a photographic shutter, the combination with blade mechanism and actuating mechanism therefor, of a retarding device also driven by the actuating mechanism and embodying a star wheel and pallet, the latter comprising a weighted arm carrying a clamping screw and a slotted arm pivoted thereto and receiving the screw to provide means for regulating the degree of separation of the contact points of the pallet.

10. In a photographic shutter, the combination with a casing, blade actuating and timing mechanism therein including a regulating element and a cover plate for the casing, of an operating device for the timing mechanism mounted on the cover plate to be detached therewith, said device being arranged to cooperate with the regulating element but being freely detachable therefrom.

11. In a photographic shutter, the combination with a casing, blade actuating and timing mechanism therein including a regulating element and a cover plate for the casing, of an operating device for the timing mechanism mounted on the cover plate to be detached therewith and embodying an index dial, a lever movable beneath the same and having an indicator thereon, and means on the arm cooperating with the regulating element but freely detachable therefrom.

12. In a photographic shutter, the combination with a casing, blade actuating and timing mechanism therein including a regulating element and a cover plate for the casing, of an operating lever for the timing mechanism pivoted to the cover plate and cooperating with the regulating element and a yielding member on the lever adapted to resiliently ride on the cover plate to center the lever and hold it in different positions of adjustment.

WILLIAM A. RIDDELL.